United States Patent
Kulmer et al.

(10) Patent No.: US 12,235,384 B2
(45) Date of Patent: Feb. 25, 2025

(54) END-OF LINE PHASE CALIBRATION OF RADAR DEVICES

(71) Applicant: Infineon Technologies AG, Neubiberg (DE)

(72) Inventors: Josef Kulmer, Graz (AT); Patrick Hoelzl, Amstetten (AT); Hao Li, Poing (DE)

(73) Assignee: Infineon Technologies AG, Neubiberg (DE)

( * ) Notice: Subject to any disclaimer, the term of this patent is extended or adjusted under 35 U.S.C. 154(b) by 391 days.

(21) Appl. No.: 17/651,331

(22) Filed: Feb. 16, 2022

(65) Prior Publication Data
US 2022/0334218 A1 Oct. 20, 2022

(30) Foreign Application Priority Data
Mar. 16, 2021 (DE) .......................... 102021106428.7

(51) Int. Cl.
*G01S 7/40* (2006.01)
*G01S 13/58* (2006.01)

(52) U.S. Cl.
CPC .............. *G01S 7/40* (2013.01); *G01S 13/584* (2013.01)

(58) Field of Classification Search
CPC .......... G01S 7/40; G01S 13/584; G01S 7/032; G01S 13/931; G01S 13/343; G01S 7/023
See application file for complete search history.

(56) References Cited

U.S. PATENT DOCUMENTS

| | | | |
|---|---|---|---|
| 2008/0246649 A1* | 10/2008 | Backes | G01S 13/904 342/25 C |
| 2009/0224963 A1 | 9/2009 | Nakanishi | |
| 2019/0383929 A1* | 12/2019 | Melzer | H03L 7/0991 |
| 2021/0063534 A1* | 3/2021 | Shams | G01S 7/4052 |
| 2021/0124014 A1 | 4/2021 | Mayer et al. | |
| 2021/0270961 A1* | 9/2021 | You | G01S 13/931 |

FOREIGN PATENT DOCUMENTS

| | | |
|---|---|---|
| DE | 102018216538 A1 | 4/2020 |
| DE | 102020119390 A1 | 1/2022 |

* cited by examiner

*Primary Examiner* — Timothy A Brainard
*Assistant Examiner* — Kenneth W Good
(74) *Attorney, Agent, or Firm* — Harrity & Harrity, LLP

(57) ABSTRACT

A method for the use in a radar system is described herein. In accordance with one implementation, the method includes providing a local oscillator signal to a transmit channel of a radar chip. The transmit channel generates an RF output signal based on the local oscillator signal. An internal RF test signal is generated by applying the local oscillator signal to the transmit channel. First and second phase values are determined for a first and a second value of an influence parameter of the radar chip based on internal measurements of the first and second phase values. Third and fourth phase values are determined for the first and second values of the influence parameter, respectively, based on the RF output signal. A calibration parameter is calculated based on the first, second, third, and fourth phase values and is used to estimate a phase of the RF output signal.

20 Claims, 6 Drawing Sheets

END-OF LINE PHASE CALIBRATION OF RADAR DEVICES

CROSS REFERENCE TO RELATED APPLICATION

This application claims priority to German Patent Application No. 102021106428.7, filed on Mar. 16, 2021, the contents of which are incorporated by reference herein in their entirety.

TECHNICAL FIELD

The present disclosure relates to the field of radar sensors, in particular to a novel concept of phase calibration which can be performed in an End-of-Line (EOL) test.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

SUMMARY

A method for the use in a radar system is described herein. In accordance with one implementation, the method includes providing a local oscillator signal to a transmit channel of a radar chip, wherein the transmit channel generates an RF output signal based on the local oscillator signal. The method further includes providing an internal RF test signal that is generated by applying the local oscillator signal to the transmit channel. A first phase value is determined for a first value of an influence parameter of the radar chip, and a second phase value is determined for a second value of the influence parameter of the radar chip based on internal measurements of the first and second phase values. These internal measurements are based on the RF test signal and the local oscillator signal. Furthermore, a third phase value is determined for the first value of the influence parameter of the radar chip, and a fourth phase value is determined for the second value of the influence parameter of the radar chip based on the RF output signal. The method further includes calculating a calibration parameter based on the first phase value, the second phase value, the third phase value, and the fourth phase value, and using—during regular operation of the radar chip—the calibration parameter to estimate a phase of the RF output signal.

In accordance with another implementation, the method includes providing a local oscillator signal to a transmit channel of a radar chip, wherein the transmit channel generates an RF output signal based on the local oscillator signal. Further, the method includes providing an internal RF test signal which is generated by applying the local oscillator signal to the transmit channel, determining a current phase value of the RF test signal, based on the local oscillator signal and the RF test signal; and determining an estimated phase of the RF output signal based on a modification of the determined current phase value with a pre-determined calibration value.

Moreover, another implementation relates to a radar system. In accordance with one example the system includes a transmit channel of a radar chip configured to receive a local oscillator signal and to generate an RF output signal based on the local oscillator signal, wherein the transmit channel is configured to provide an internal RF test signal, which is generated by applying the local oscillator signal to the transmit channel. The method further includes a monitoring circuit configured to receive the local oscillator signal and the RF test signal and further configured to generate a measurement signal indicative of a current phase of the RF test signal. A processing unit is configured to determine an estimated phase based on modifying the current phase with a pre-determined calibration factor.

BRIEF DESCRIPTION OF THE DRAWINGS

The implementation can be better understood with reference to the following drawings and descriptions. The components in the figures are not necessarily to scale; instead emphasis is placed upon illustrating the principles of the implementation. In the figures, like reference numerals designate corresponding parts. In the drawings.

DETAILED DESCRIPTION

Modern radar systems make use of highly integrated RF circuits which may incorporate all core functions of an RF font-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

Modern FMCW radar systems may include multiple input and multiple output channels and are thus referred to as multiple input/multiple output (MIMO) systems. The input and output channels (receive and transmit channels). However, in simple systems one input channel and one output channel may be sufficient. The RF front-ends of the radar systems, which includes the mentioned input and output channels, may be distributed across a plurality of semiconductor chips, which are referred to as monolithic microwave integrated circuits (MMICs). Such radar systems are not only capable of measuring distances but also the respective velocities and azimuth angles (also referred to as Direction of Arrival, DoA, of the radar echoes).

Particularly the angle measurement needs a calibration of the phases of the transmitted radar signals (output signals of the mentioned output channels) in order to obtain the desired accuracy. Furthermore, the phases and thus also the phase differences between (relative phases of) the transmitted radar signals may change due to a change of temperature, supply voltage and/or other physical parameters.

Figure 1:
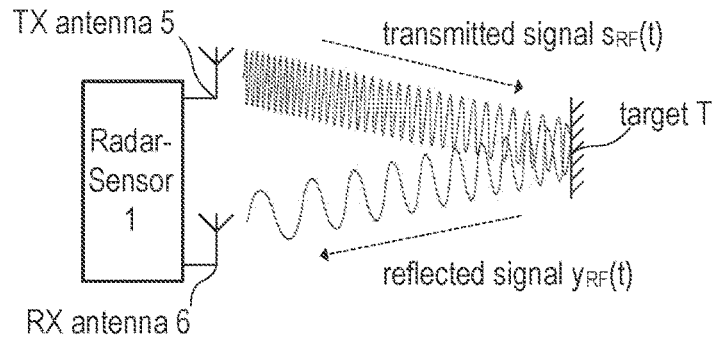
FIG. 1 is a diagram illustrating the operating principle of a frequency-modulated continuous-wave (FMCW) radar system for distance and/or velocity measurement.

FIG. 1 illustrates a radar sensor 1, which radiates frequency-modulated continuous-wave (FMCW) radar signals. However, the concepts and implementations described herein are not limited to FMCW radar systems but may be readily applied in other radar systems such as phase-modulated continuous-wave (PMCW) radar systems or radar systems using other modulation techniques. As shown in FIG. 1, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 (quasi-) continuously radiates an RF signal $s_{RF}(t)$, which is frequency-modulated, for example, by a saw-tooth-shaped signal. In a PMCW radar system the phase of the radar signal may be modulated by a pseudo random modulation signal.

Figure 3:
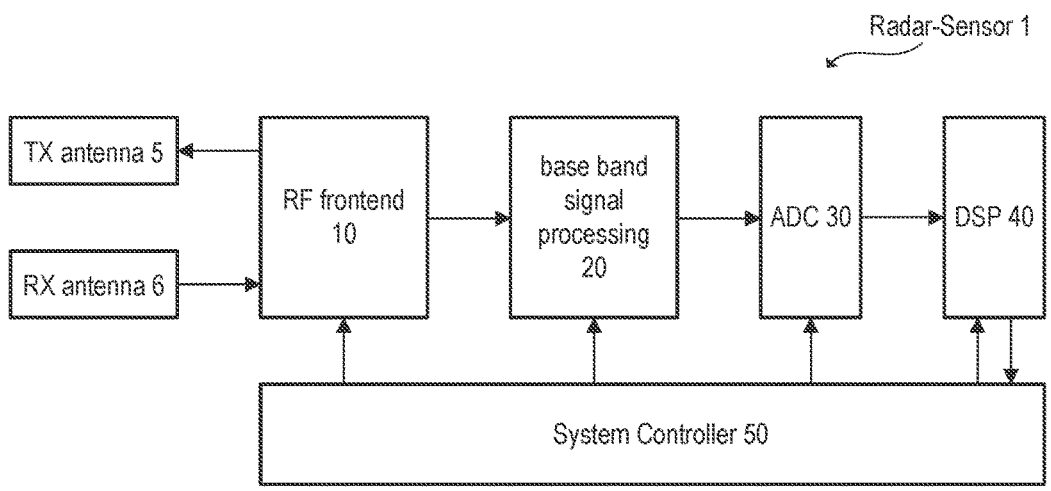
FIG. 3 is a block diagram illustrating the basic structure of an FMCW radar device.

When the radiated signal $s_{RF}(t)$ is back-scattered at an object T, which is located in the field of view of the radar system, the back-scattered RF signal $y_{RF}(t)$ is received by the reception antenna 6. The object T is usually referred to as "radar target". In a more general example, several targets may be in the field of view of a radar sensor. Further, an antenna array may be used instead of a single RX antenna. Similarly, an antenna array may be used instead of a single TX antenna. Using multiple RX and TX antennas in a multi-channel radar system allows for the measurement of the angle of incidence of a radar echo (azimuth angle), usually referred to as direction of arrival (DoA). Measurement of the direction of arrival is utilized for many applications, and thus most radar sensors will make use of antenna arrays. To keep the drawings simple, only one TX antenna and one RX antenna are shown in FIGS. 1 and 3. It is understood that the concepts described with reference to these figures are readily applicable to radar sensors with multiple input and output channels and respective antenna arrays.

Figure 2:
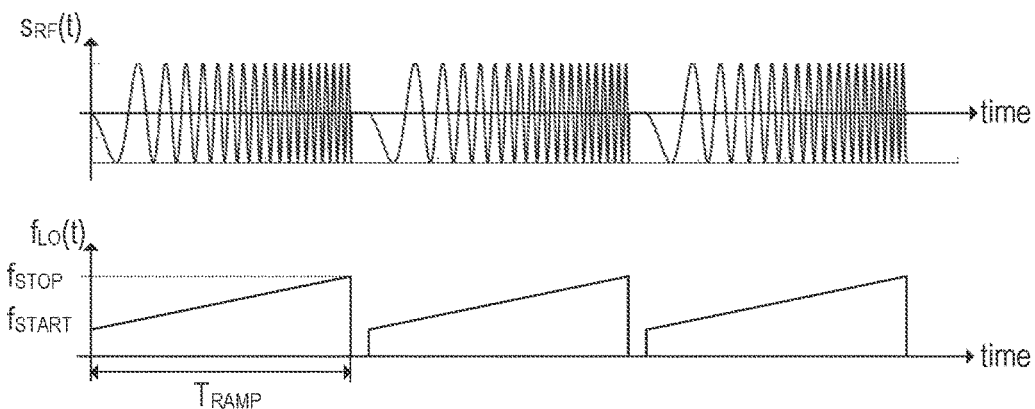
FIG. 2 includes two timing diagrams illustrating the frequency modulation of the radio frequency (RF) signal used in FMCW radar systems.

FIG. 2 illustrates the mentioned frequency-modulation of the signal $s_{RF}(t)$. As shown in the top diagram of FIG. 2, the signal $s_{RF}(t)$ is composed of a sequence of "chirps", e.g., sinusoidal waveforms with increasing (up-chirp) or decreasing (down-chirp) frequency. In some implementations, the instantaneous frequency $f_{LO}(t)$ of a chirp increases linearly from a start frequency $f_{START}$ to a stop frequency $f_{STOP}$ within a defined time span TRAMP (see bottom diagram of FIG. 2). Such a chirp is also referred to as "linear frequency ramp". A frequency-modulated signal with a sequence of three identical linear frequency ramps is illustrated in FIG. 2. It is noted, however, that the parameters $f_{START}$, $f_{STOP}$, $T_{CHIRP}$ and the pause between the individual frequency ramps, as well as the number of chirps within one sequence may vary dependent on the actual implementation of the radar device 1 and may also vary during operation of the radar device. For one radar measurement a ramp sequence of, e.g., 256 or 512 frequency ramps may be used. The received radar signal, which corresponds to one ramp sequence, is then processed to determine distance, velocity and DoA of one or more radar target. As mentioned above, modulation techniques other than frequency modulation may be used.

FIG. 3 is a block diagram that illustrates an example structure of radar sensor 1. Accordingly, at least one transmission antenna 5 (TX antenna(s)) and at least one reception antenna 6 (RX antenna(s)) are connected to an RF frontend 10, which may be integrated in a single semiconductor chip, usually referred to as monolithic microwave integrated circuit (MMIC). Herein, MMICs are also referred to as radar chips. As mentioned, the RF circuitry may also be distributed across more than one radar chip. The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g., the received signal $y_{RF}(t)$, see FIG. 1) into the base-band or IF-band. As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both receiving and transmitting electromagnetic (radar) signals. In some implementations, a directional coupler (e.g., a circulator) may be used to separate RF signals to be transmitted to the radar channel from RF signals received from the radar channel.

In the case of an FMCW radar sensor, the RF signals radiated by the TX antenna 5 may be in the SHF (Super High Frequency) or the EHF (Extremely High Frequency) band, e.g., in the 24 GHz ISM band or in the range of e.g. about 76-81 GHz in automotive applications. As mentioned, the RF signal received by the RX antenna 6 includes the radar echoes, e.g., the signals that have been back-scattered at the radar target(s). The received RF signal $y_{RF}(t)$ is down-converted into the base-band and further processed in the base-band using analog signal processing (see FIG. 3, base-band signal processing chain 20), which basically includes filtering and amplification of the base-band signal and thus determines the bandwidth of the received signal. The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate software/firmware. The processor may be included, e.g., in a microcontroller, a digital signal processor, or the like. The digital signal processor 40 (DSP) may be part of the system controller 50 or separate therefrom. The RF frontend 10 and the analog base-band signal processing chain 20 and optionally the also the ADC 30 as well as part of the digital signal processing may be integrated in a single MMIC. However, the components may be distributed among two or more integrated circuits.

Figure 4:
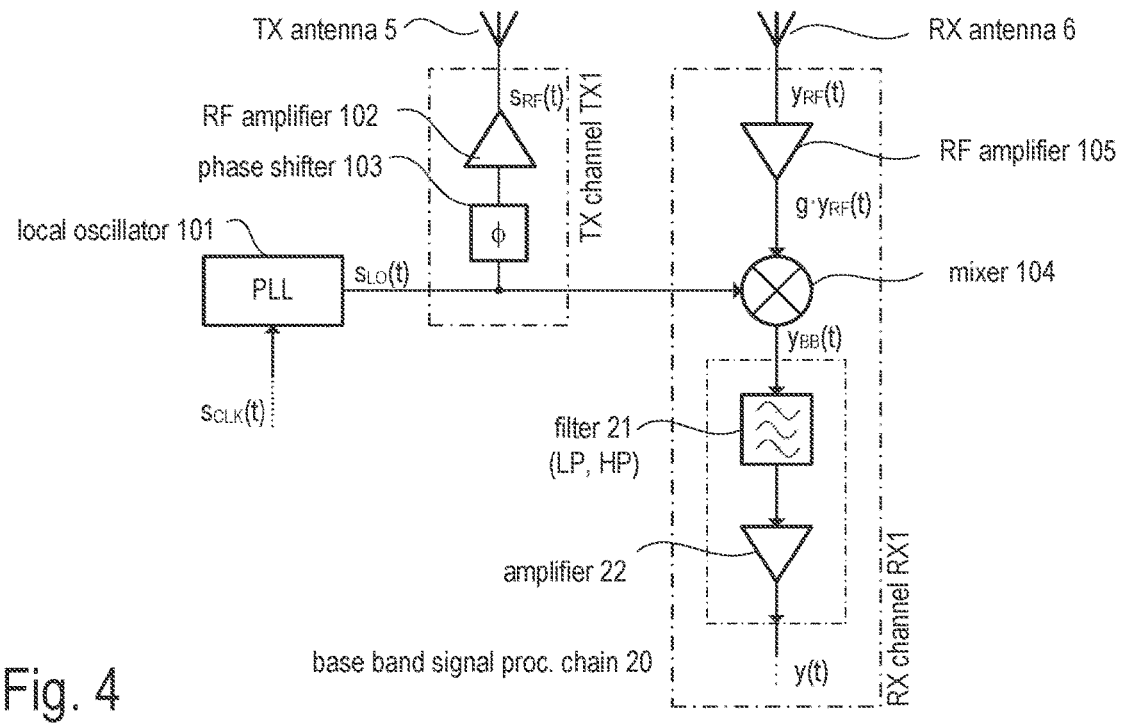
FIG. 4 is a circuit diagram illustrating one example of an analog RF frontend with one input channel and one output channel, and analog base-band signal processing.

FIG. 4 illustrates one example implementation of the RF frontend 10, which may be included in the radar system shown in FIG. 3. It is noted that FIG. 4 is a simplified circuit diagram illustrating the basic structure of an RF frontend. Actual implementations, which may heavily depend on the application, are of course more complex and may include several RX channels (input channels) and/or TX channels (output channels) in a single MMIC. The RF frontend 10 includes a local oscillator 101 (LO) that generates an RF signal $s_{LO}(t)$, which may be frequency-modulated as explained above with reference to FIG. 2. The signal $s_{LO}(t)$ is also referred to as LO signal. In some implementations, the local oscillator 101 includes a phase-locked loop that is clocked by a clock signal $s_{CLK}(t)$.

The LO signal $s_{LO}(t)$ is processed in the transmission signal path as well as in the reception signal path. The transmission signal $s_{RF}(t)$ (outgoing radar signal, RF output signal), which is radiated by the TX antenna 5, is generated by amplifying the LO signal $s_{LO}(t)$, e.g., using an RF power amplifier 102. The output of the amplifier 102 is coupled to the TX antenna 5. The RF signal processing chain coupled between the local oscillator 101 and a particular TX antenna is referred to as TX channel or RF output channel, which is labelled TX1 in the example of FIG. 4. In order to adjust the phase of the outgoing radar signal $s_{RF}(t)$ the respective output channel TX1 includes a phase shifter 103, which may be coupled between an input circuit node of the output channel TX1 (at which the LO signal $s_{LO}(t)$ is received) and the RF amplifier 102. The phase shifter 103 may also be placed after RF amplifier 102 or may be a part of RF amplifier 102. An RF output channel may be enabled or disabled, e.g., by enabling or disabling the RF amplifier 102.

The received signal $y_{RF}(t)$ (incoming radar signal, RF input signal), which is provided by the RX antenna 6, is directed to a mixer 104. In some implementations, the received signal $y_{RF}(t)$ (e.g., the antenna signal) is pre-amplified by RF amplifier 105 (gain g), so that the mixer receives the amplified signal $g \cdot y_{RF}(t)$ at its RF input port. The mixer 104 further receives the LO signal $s_{LO}(t)$ at its reference input port and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 3), which basically includes one or more filters (e.g., a band-pass 21 or a combination of high pass and low pass filters) to remove undesired side bands and image frequencies as well as one or more amplifiers such as amplifier 22. The analog output signal, which may be supplied to an analog-to-digital converter (cf. FIG. 3), is denoted as y(t). In some implementations, the digital post-processing of the digitized output signals (digital radar signal y[n]) may be performed (e.g., Range Doppler Analysis). The RF signal processing chain coupled between a particular RX antenna and the ADC that provides the respective digital radar signal y[n] (in the base band) is referred to as RX channel or RF input channel, which is labelled RX1 in the implementation of FIG. 4.

In some implementations, the mixer 104 down-converts the RF signal $g \cdot y_{RF}(t)$ (amplified antenna signal) into the base band. The respective base band signal (mixer output signal) is denoted by $y_{BB}(t)$. The down-conversion may be accomplished in a single stage (e.g., from the RF band into the base band) or via one or more intermediate stages (from the RF band into an intermediate frequency band and subsequently into the base band). In some implementations, the mixer 104 may be implemented as IQ-mixer (In-phase and Quadrature mixer). In this case the analog base-band signal y(t) and thus also the digital radar signal y[n] are composed of an in-phase and a quadrature component, which may be regarded as real and imaginary parts of a complex-valued signal.

Figure 5:
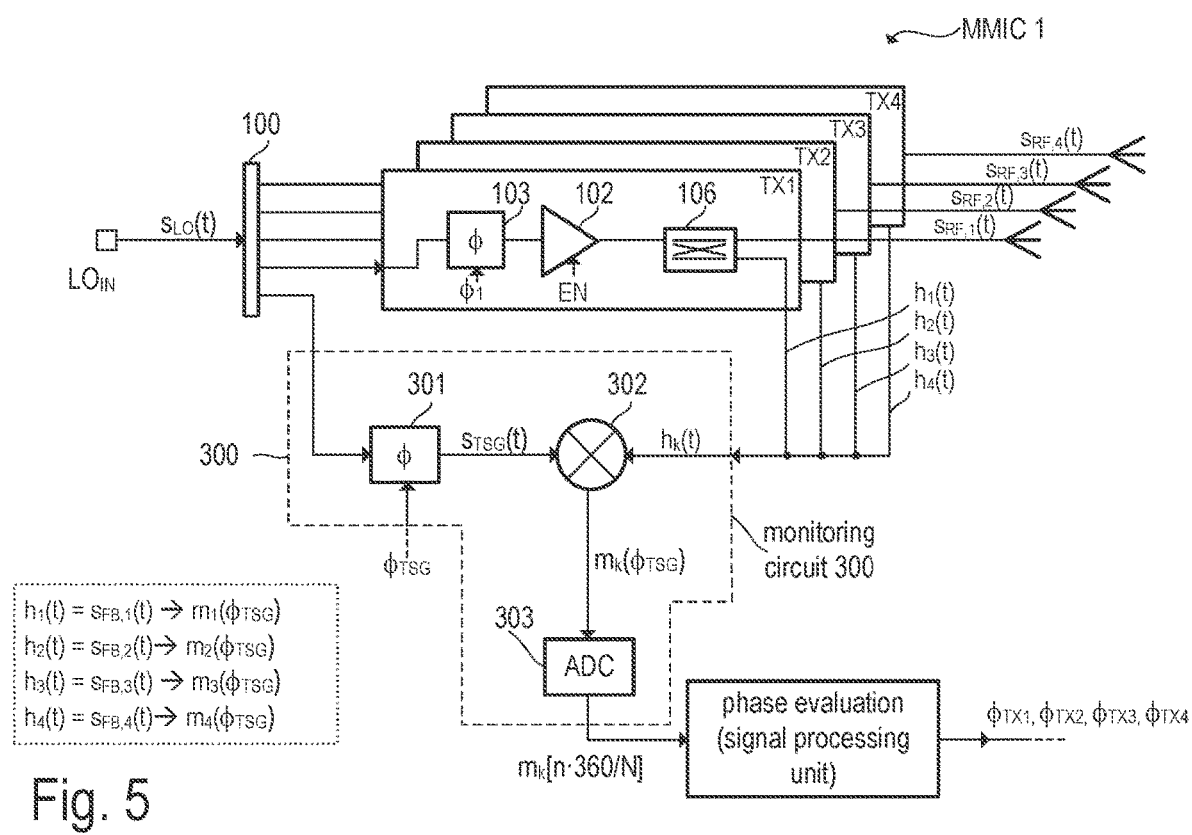
FIG. 5 is a circuit diagram illustrating a radar system with a plurality of RF output channels and a monitoring circuit for measuring the phases of the RF output signals of the RF output channels (output phases).

FIG. 5 illustrates one implementation of a radar system with more than one RF output channel, wherein the RF input channels, which are not necessary for the further discussion have been omitted to simplify the illustrations. In some implementations, the RX channels of the radar systems (not shown in FIG. 5) described below may be implemented as shown, for example, in FIG. 4. According to FIG. 5, the radar system includes an RF contact $LO_{IN}$ (e.g. a chip pin or a solder ball), at which a local oscillator signal $s_{LO}(t)$ is received, e.g. from a master MMIC including a local oscillator 101. In some implementations, the radar system includes four RF output channels TX1, TX2, TX3, and TX4. Each one of the RF output channels TX1, TX2, TX3, and TX4 receives the LO signal $s_{LO}(t)$ and is configured to generate—in an enabled state—an RF output signal $s_{RF,1}(t)$, $s_{RF,2}(t)$, $s_{RF,3}(t)$, and, respectively, $s_{RF,4}(t)$ based on the local oscillator signal $s_{LO}(t)$. The RF output channels TX1, TX2, TX3, and TX4 may be implemented similar to the output channel TX1 in the example of FIG. 4. In some implementations, dependent on the actual application, an MMIC may include more or fewer RF output channels.

The RF output channels TX1, TX2, TX3, and TX4 are configured to be enabled or disabled, which may be done, for example, by enabling and disabling the power amplifier 102 and/or the phase shifter 103 included in each RF output channel. The LO signal $s_{LO}(t)$ is distributed to the RF output channels TX1, TX2, TX3, and TX4 by the signal distribution circuit 100, which may be implemented, for example, using one or more RF power divider circuits, strip lines and other RF circuit components. Although not explicitly shown, the signal distribution circuit 100 may also be configured to provide the LO signal $s_{LO}(t)$ to the RF input channels (RX channels, not shown in FIG. 5). Furthermore, each RF output channels TX1, TX2, TX3, and TX4 is configured to provide a representation of the respective RF output signals $s_{RF,1}(t)$, $s_{RF,2}(t)$, $s_{RF,3}(t)$, $s_{RF,4}(t)$ as sense signals $h_1(t)$, $h_2(t)$, $h_3(t)$, and, $h_4(t)$. For this purpose each RF output channel TX1, TX2, TX3, and TX4 includes a coupler 106 (e.g., a directional coupler such as a rat race coupler, a coupled-line directional coupler, or the like) which is arranged between the amplifier output 102 and the RF output port, which forms basically an interface to the antenna. The coupler 106 directs the RF output signal $s_{RF,1}(t)$, $s_{RF,2}(t)$, $s_{RF,3}(t)$, $s_{RF,4}(t)$ to the respective output port and also provides a representation of the respective RF output signal as sense signals $h_1(t)$, $h_2(t)$, $h_3(t)$, and $h_4(t)$.

The RF output signals $s_{RF,k}(t)$ and the respective sense signals $h_k(t)$ (with k=1, ..., 4) have a fixed phase relation and differ in amplitude. That is, the sense signals $h_k(t)$ are scaled and phase shifted (with a fixed offset) versions of the respective RF output signals $s_{RF,k}(t)$, and, when the phase of the RF output signals $s_{RF,k}(t)$ change, then the phases of the respective sense signals $h_k(t)$ will change accordingly. In other words, the phases of the sense signals $h_k(t)$ are indicative of the respective phases of the RF output signals $s_{RF,k}(t)$. The antennas connect to the respective RF output ports at chip contacts which may be solder balls or the like dependent on the chip package used.

In some implementations, in radar systems with more RF output channels TXk the phases $\phi_{TXk}$ of the RF output signals $s_{RF,k}(t)$ (k=1, 2, 3, etc.) need to be calibrated in order to improve the quality and accuracy of measurements (particularly DoA measurements). In this regard it should be noted that the phase may vary, for example, due to temperature variations, chip supply voltage, aging effects, etc. Therefore, a monitoring of the phases and a regular calibration may be desirable, wherein the relative phases of the RF output signals $s_{RF,k}(t)$ may be of particular interest. The term "relative phases" denotes the phase differences between the phases of the RF output signals $s_{RF,k}(t)$.

To determine a phase of a signal, a reference phase may be utilized, and, in some implementations, the reference phase is the phase $\phi_{LO}$ of the LO signal $s_{LO}(t)$. In the implementation of FIG. 5, to obtain a measurement signal which is indicative of the phase $\phi_{TXk}$ of the RF output signal $s_{RF,k}(t)$ of channel TXk (k=1, ..., 4 in FIG. 5), the representation of the RF output signal $s_{RF,k}(t)$ (e.g. the sense signal $h_k(t)$) is mixed with the LO signal $s_{LO}(t)$ using a mixer 302, wherein an additional phase shift is imposed on the LO signal $s_{LO}(t)$. This additional phase shift is referred to as test phase $\phi_{TSG}$, which can be set by phase shifter 301, which receives a control input indicative of the desired test phase $\phi_{TSG}$. It is noted that, when the sense signal $h_k(t)$) is a sine signal with a specific frequency $f_{LO}$ and phase $\phi_{TXk}$, and the LO signal $s_{LO}(t)$ is a sine signal with the same frequency $f_{LO}$ and phase $\phi_{LO}$, then the mixer output signal will be a DC signal with a signal level indicative of the phase $\phi_{TXk}$ (relative to the phase $\phi_{LO}$). In essence, the mixer output signal will be indicative of the phase difference $\phi_{TXk}-\phi_{LO}$, wherein $\phi_{LO}$ may be defined as zero for the current discussion without loss of generality. The mixer output signal is referred to as measurement signal $m_k(\phi_{TSG})$; it depends on the (known) setting of the test phase $\phi_{TSG}$ and the index k corresponds to the output channel TXk which is enabled during the measurement. The DC level of the signal $m_k(\phi_{TSG})$ is indicative of the phase difference $\phi_{TXk}-\phi_{LO}$ and thus of the sought phase $\phi_{TXk}$.

Only one selected RF output channel, e.g. TX1, is enabled for a measurement of the respective phase, e.g. $\phi_{TX1}$, wherein the other RF output channels (TX2-TX4 in the present example) are disabled. In the following the phase measurement is explained in more detail for RF output channel TX1. It is understood that the same procedure can be done for the other RF output channels TX2-TX4.

The process of the acquisition of a measurement signal $m_k(\phi_{TSG})$ is further explained below with reference to FIG. 6. In the present example the test phase $\phi_{TSG}$ is varied in steps of 45° from 0° to 315° which corresponds to a full rotation of the phase; a further step of 45° would result in a phase of 360° which would be the start of the next rotation. That is, the test phase $\phi_{TSG}$ can be expressed as $$\phi_{TSG}[n]=n\cdot 360/N, \text{ for } n=0,\ldots,N-1, \quad (1)$$

wherein N describes the length of the sequence and thus the number of samples obtained for the measurement signal $m_k(\phi_{TSG}[n])$, which can also be written as discrete signal $m_k[n\cdot 360/N]$. In the example of FIG. 6, the number of samples is N=8. The phase of the discrete signals $m_k[n\cdot 360/N]$ represents the phase of the sense signal $h_k(t)$.

Figure 6:
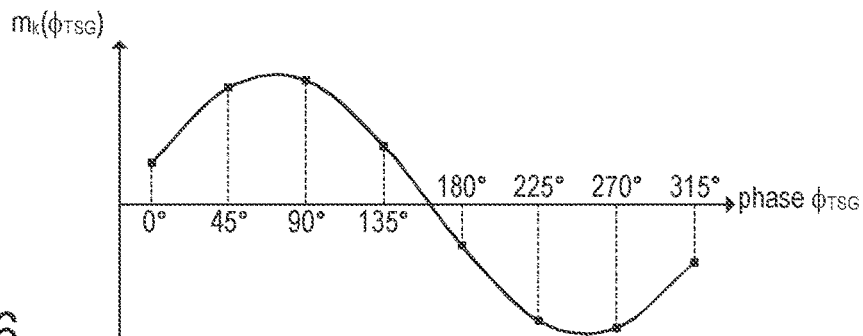
FIG. 6 illustrates one example concept of phase measurement using the monitoring circuit of FIG. 5.

In the example of FIG. 6, the phase $\phi_{TSG}$ is varied in N equidistant phase steps $\Delta\phi=360/N$ until a full phase rotation has been reached. In other words, the N samples of $m_k[n\cdot 360/N]$ may be regarded as exactly one period of a periodic sinusoidal discrete signal and, therefore, the Discrete Fourier Transform of $m_k[n\cdot 360/N]$ yields a sequence $M_k[m]$ (for m=0, ... N−1), in which all samples are zero except the spectral value $M_k[1]$. It is understood that the spectral value $M_k[1]$ of the sequence $$M_k[m]=DFT\{m_k[n\cdot 360/N]\} \quad (2)$$

is a complex value having a magnitude $|M_k[1]|$ and an argument $\arg\{M_k[1]\}$.

The Discrete Fourier Transform may be implemented using the well-known Fast Fourier Transform (FFT) algorithm. However, other algorithms are known to calculate the spectral value $M_k[1]$. The calculations of the sought phases $\phi_{TXk}$ can be determined by calculating the argument of the complex spectral value $M_k[1]$, e.g.

$$\phi_{TXk}=\arg\{M_k[1]\}, \text{ for } k=1,2,\text{etc.} \quad (3)$$

It is understood that the concept illustrated in FIG. 6 is merely one example. For example, the test phase may be stepwise rotated for two full rotations, e.g. $\phi_{TSG}[n]=n\cdot 720/N$. In this case, the sought phase information is in the spectral value $M_k[2]$ instead of $M_k[1]$.

Figure 7:
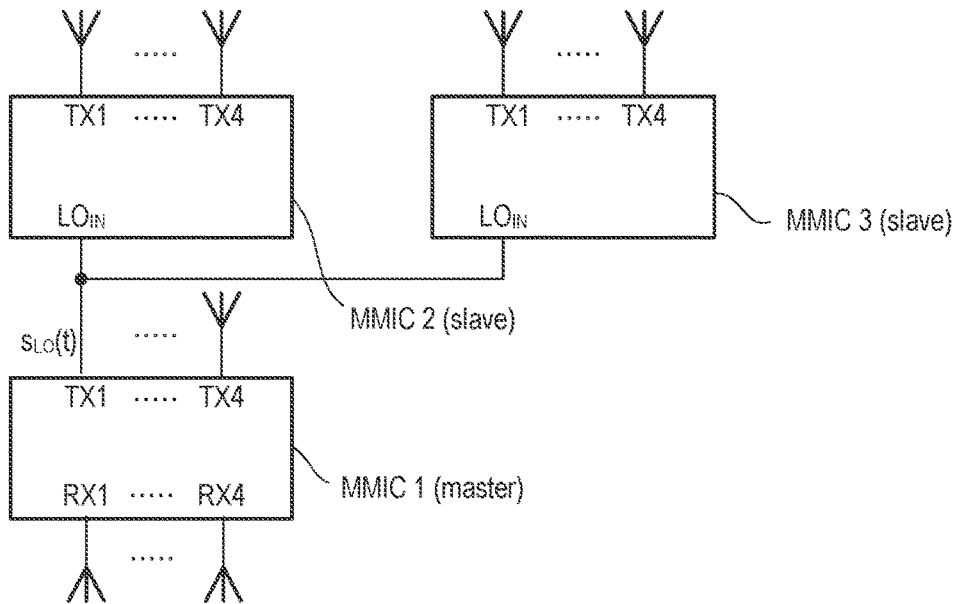
FIG. 7 illustrates the distribution of the local oscillator signal from one (master) radar chip to one or more other (slave) radar chips.

As mentioned, a multi-channel radar system may include two or more radar chips (MMICs), wherein the RF input channels TX1, TX2, etc. may be integrated in different radar chips. One example is illustrated in FIG. 7. The radar system of FIG. 7 includes three radar chips 1, 2, 3, wherein the first radar chip 1 may be regarded as the master radar chip because it provides the LO signal $s_{LO}(t)$ for the other radar chips 2 and 3 (slave radar chips). Accordingly, the radar chip 1 outputs the LO signal $s_{LO}(t)$ at an RF chip contact (e.g., the output of output channel TX1), whereas the other radar chips 2 and 3 receive the LO signal $s_{LO}(t)$ at the RF chip contacts $LO_{IN}$ (see also FIG. 5). In some implementations, the chips 2 and 3 include four output channels TX1-TX4 per chip, wherein the master chip 2 includes four input channels RX1-RX4. One output channel TX1 of the master chip 1 is used for LO signal distribution.

The LO signal $s_{LO}(t)$ may have a different phases when arriving at the radar chips 2, 3 (and thus also the RF output signals of the output channels). Further, the phases are subject to a temperature drift, chip supply voltage variations, aging effects, etc. Each chip may include an internal monitoring circuit 300 as illustrated in the example of FIG. 5. However, the phase values determined with the help of the monitoring circuit are only rough estimates for the true output phase values. Moreover, the monitoring circuits 300 of different radar chips may have slightly different characteristics due to production tolerances, and the mentioned phase drift due to temperature variations, etc. may be different in different radar chips. For this reasons, the internally measured phases, which are determined with the help of the internal monitoring circuits 300 of the radar chips 1, 2, 3, are not a sufficiently precise estimation of the true output phases of the RF output signals of the output channels TX1, TX2, etc.

Figure 8A:
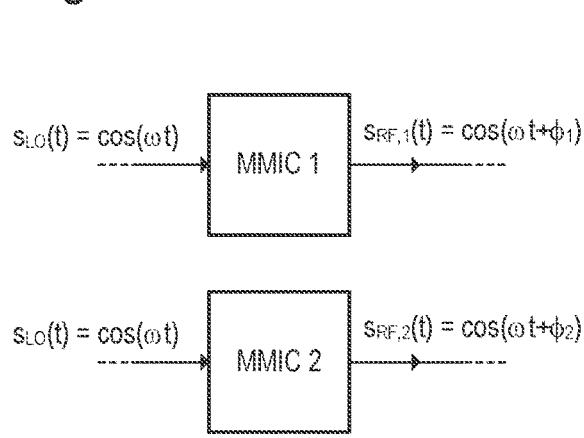
FIGS. 8A and 8B illustrate the non-linear temperature dependency of the actual output phases of two different output channels arranged in separate radar chips.
Figure 8B:
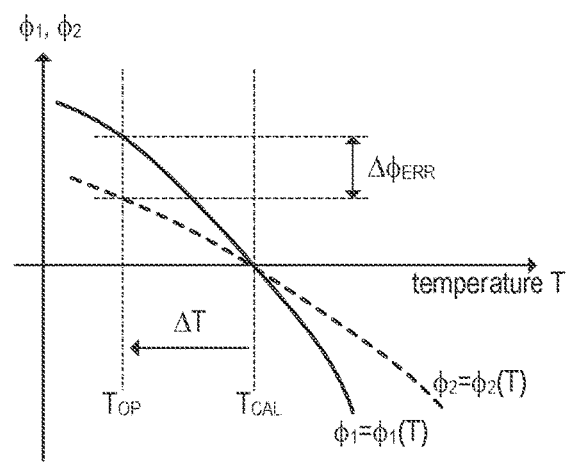

FIG. 8 illustrates the different characteristics of the output phase drift in two different MMICs 1, 2. FIG. 8A illustrates two MMICs 1 and 2 each receiving the LO signal $s_{LO}(t)$ with the same phase, which may be assumed to be zero in the present example. The LO signal $s_{LO}(t)$ may be approximated as a sinusoidal signal, e.g. $s_{LO}(t)=\cos(\omega t)$, wherein $\omega$ is $2\pi f_{LO}$. In FIG. 8A, the signals $s_{RF,1}(t)$ and $s_{RF,2}(t)$ denote two different RF output signals of two different output channels arranged in two different radar chips 1, 2. These RF output signals $s_{RF,1}(t)$ and $s_{RF,2}(t)$ are also sinusoidal signals and can be written as $s_{RF,1}(t)=\cos(\omega t+\phi_1)$ and $s_{RF,2}(t)=\cos(\omega t+\phi_2)$, respectively. The amplitudes have been normalized to one in the present example. The phases $\phi_1$ and $\phi_2$ are subject to drift effects such as temperature drift or drift effects caused by other influence parameters (e.g., supply voltage). FIG. 8B illustrates example characteristic curves representing the temperature dependency of the phases $\phi_1$ and $\phi_2$; the solid line represents the phase $\phi_1$ and the dashed line represents the phase $\phi_2$ over temperature.

Various concepts for calibrating the output phases ($\phi_1$ and $\phi_2$ in the example of FIG. 8) may be utilized. Calibration may be done for each considered influence parameter potentially affecting the signal phase, e.g., temperature, supply voltage, local oscillator input power etc. In the following, the calibration of temperature-dependent phase changes is described. However, the extension of this concept to other influence parameters is straight forward. Considering the influence parameter "temperature", a single calibration is performed at temperature $T_{CAL}$. As a consequence, even if—after calibration—the phases are equal at temperature $T_{CAL}$ (e.g. $\phi_1(T_{CAL})=\phi_2(T_{CAL})$), the phases will be different at other temperature levels. In the example of FIG. 8B, the phases differ by $\Delta\phi_{ERR}$ at temperature $T_{OP}$ ($\phi_1(T_{OP})=\phi_2(T_{OP})+\Delta\phi_{ERR}$). In view of FIG. 8B, a calibration at a single temperature is generally not sufficient if the radar system is operated, in practice, in a wide temperature range.

Figure 9:
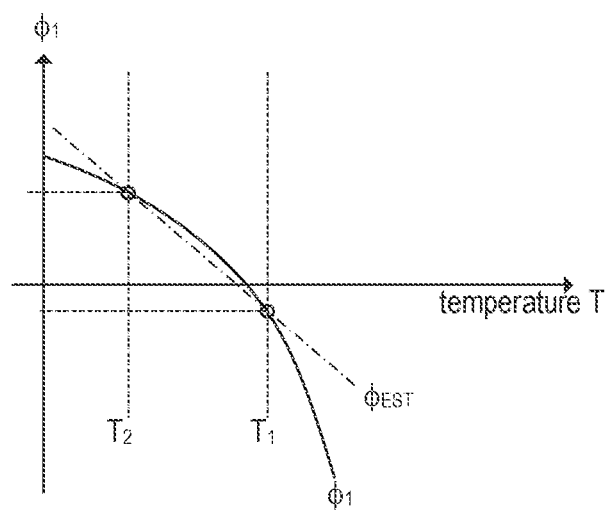
FIG. 9 illustrates a two-point calibration and a linear approximation of the nonlinear temperature dependency of FIG. 7.

FIG. 9 illustrates a known approach that uses a two-point calibration, wherein e.g., the phase $\phi_1$ of the RF output signal $s_{RF,1}(t)$ is calibrated at two temperatures $T_1$ and $T_2$. A linear approximation $\phi_{EST}(T)$ can then be used to take into account the temperature drift of the phase $\phi_1(T)$. The actual temperature can be measured during operation (e.g., before a data acquisition cycle) of the radar system and the output phase $\phi_1$ can be tuned in accordance with the linear approximation. Such tuning may be accomplished, for example, by the phase shifter 103 included in the respective output channel (cf. FIG. 5). Alternatively, a temperature-dependent phase deviation may be compensated during the digital signal processing of the digital radar signal. In the example of FIG. 9, the following approximation is used $$\phi_1(T) \approx \phi_{EST}(T) = \phi_1(T_2) + (T-T_2) \cdot (\phi_1(T_1) - \phi_1(T_2))/(T_1-T_2), \quad (4)$$

wherein the temperatures $T_1$ and $T_2$ are known and the respective phases $\phi_1(T_1)$ and $\phi_1(T_2)$, respectively, are measured during the calibration process.

A two-point calibration and a linear approximation as discussed above with reference to FIG. 9 does not take into account the non-linearity of the actual phase-temperature dependency. However, a more precise approximation of the non-linear phase-temperature dependency would require a multi-point calibration during an EOL test at multiple temperature values.

Figure 10:
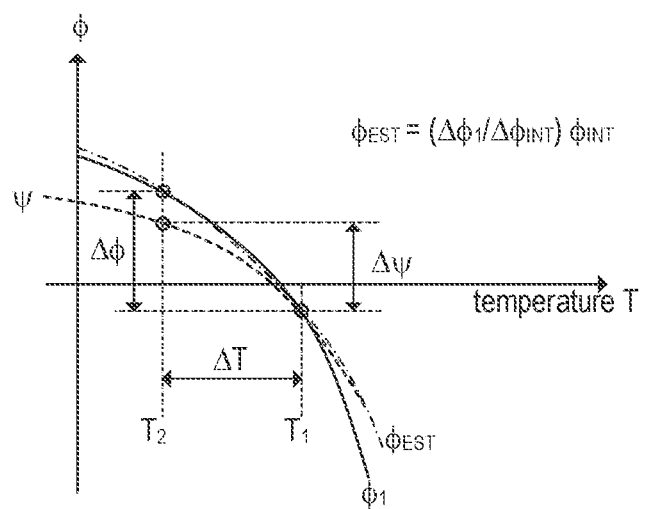
FIG. 10 illustrates one example of a novel calibration concept for estimating the actual output phase of an output channel based on the phase determined using the monitoring circuit of FIG. 5.

As discussed below, some techniques and implementations described herein enable the nonlinearity of the phase-temperature dependency to be accounted for while only requiring calibration measurements at two different temperatures $T_1$ and $T_2$. In the diagram shown in FIG. 10, the phase $\psi(T)$ (dashed line) denotes an internal phase determined by the monitoring circuit 300 included in the radar chip (see FIG. 5), the phase $\phi(T)=\phi_1(T)$ (solid line) denotes the real, external phase of the RF output signal of the considered TX channel, and $\phi_{EST}(T)$ (dash-dotted line) denotes the estimation of the real (external) phase $\phi(T)$ based on the internal phase $\psi(T)$. The implementations described herein seek to estimate $\phi_{EST}(T)$ based on measurements of $\psi(T)$.

At a first calibration point—at temperature $T_1$—the phase values $\phi(T_1)$ and $\psi(T_1)$ are determined. At a second calibration point—at temperature $T_2=T_1+\Delta T$—the phase values $\phi(T_2)$ and $\psi(T_2)$ are determined. From the measured phase values, the phase differences $$\Delta\phi=\phi(T_2)-\phi(T_1) \text{ and} \quad (6)$$

$$\Delta\psi=\psi(T_2)-\psi(T_1) \quad (7)$$

can be calculated.

During operation of the radar system, the estimation $\phi_{EST}(T)$ of the real phase $\phi(T)$ can be determined according to the following formula:

$$\phi_{EST}(T)=k \cdot \psi(T)+\Delta\phi_{OFF},$$

with $$k=\Delta\phi/\Delta\psi, \quad (8)$$

based on the internally measured phase $\psi(T)$ determined with the help of the monitoring circuit 300 (see FIG. 5) included in the radar chip. In equation 8 the offset value $\Delta\phi_{OFF}$ is calculated such that, at one calibration point—e.g. at temperature $T_1$—the estimated phase equals the real phase, e.g. $\phi_{EST}(T_1)=\phi(T_1)$. Accordingly, the offset value $\Delta\phi_{OFF}$ can be calculated as follows:

$$\Delta\phi_{OFF}=\phi(T_1)-k \cdot \psi(T_1). \quad (9)$$

In many applications, the parameter of interest is the estimated change of the output phase $\phi=\phi_1$ of a particular RF output signal $s_{RF,1}(t)$ of a particular output channel TX1 rather than the absolute phase value. In this case the offset value $\Delta\phi_{OFF}$ is irrelevant and only the current change $\Delta\psi(T)$ of the internally measured phase is considered. That is, $$\Delta\phi_{EST}=k \cdot \Delta\psi(T). \quad (10)$$

The concept described above may be employed in radar systems, in which multiple TX channels are integrated in different radar chips (see FIG. 7). In such a system, an estimated phase $\phi_{EST}$ may be determined for each channel based on the corresponding phase measured with the help of the monitoring circuit, which is included in the same radar chip as the considered TX channel.

Figure 11:
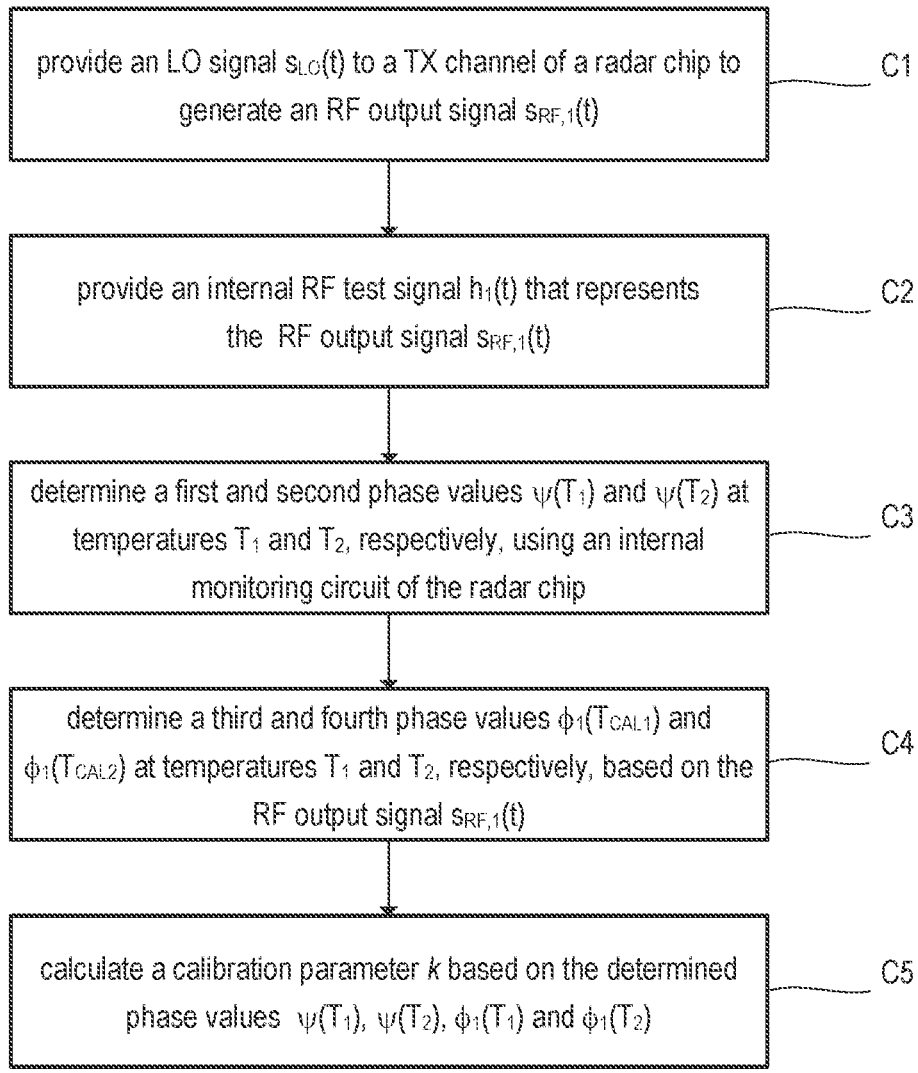
FIG. 11 illustrates an example method for determining a calibration parameter, which may later be used during operation of a radar system for phase measurements.

FIG. 11 illustrates an example method for determining a calibration parameter, which may later be used during operation of a radar system for phase measurements. Accordingly, an LO signal $s_{LO}(t)$ is provided to a transmit channel (see, e.g., FIG. 5, output channel TX1) of a radar chip (see, e.g., FIG. 7, MMIC 2), wherein the transmit channel generates an RF output signal $s_{RF,1}(t)$ based on the LO signal $s_{LO}(t)$ (cf. FIG. 11, step C1). An internal RF test signal $h_1(t)$ is provided, which is also generated based on the LO signal in the transmit channel (cf. FIG. 11, step C2). In the example of FIG. 5, the RF test signal $h_1(t)$ is provided by the directional coupler 106 included in output channel TX1, and the RF test signal $h_1(t)$ basically represents the RF output signal $s_{RF,1}(t)$ but has only a fraction of the power thereof.

The method further includes determining a first phase value $\psi(T_1)$ for a first influence parameter value (e.g., temperature $T_1$) of the radar chip and a second phase value $\psi(T_2)$ for a second influence parameter value (e.g. temperature $T_2$) of the radar chip. The first and second phase values $\psi(T_1)$, $\psi(T_2)$ are measured internally (e.g., using a circuit integrated in the radar chip, see FIG. 5, monitoring circuit 300), wherein the internal measurements are based on the RF test signal ($h_1(t)$) and the local oscillator signal ($s_{LO}(t)$) (cf. FIG. 1, step C3). Furthermore, the method includes determining a third phase value $\phi(T_1)=\phi_1(T_1)$ for the first influence parameter value (e.g., temperature $T_1$) of the radar chip and a fourth phase value $\phi(T_2)=\phi_1(T_2)$ for the second influence parameter value (e.g. temperature $T_2$) of the radar chip based on the RF output signal $s_{RF,1}(t)$ (cf. FIG. 11, steps C4). Finally, a calibration parameter k is calculated based on the first phase value $\psi(T_1)$, the second phase value $\psi(T_2)$, the third phase value $\phi(T_1)$, and the fourth phase value $\phi(T_2)$ (cf. FIG. 11, step C5). In some implementations, the phase differences $\Delta\psi$ and $\Delta\phi$ may be calculated according to equations 6 and 7 and the calibration parameter k may be calculated as the ratio $\Delta\phi/\Delta\psi$ of these phase differences (see also equation 8).

As mentioned, the first and second influence parameter values may be two different temperature values $T_1$ and $T_2$, at which the calibration measurements are carried out. Alternatively, the first and second influence parameter values may be two different supply voltages $V_1$ and $V_2$ of the MMIC currently under test. The method can be performed for different predetermined influence parameters that potentially affect the phase (e.g., temperature, supply voltage, etc.). In some implementations, the phase variations caused by temperature variation and supply voltage variation are superposed. In this case two calibration parameters can be calculated, a first calibration parameter $k_T$ representing the calibration at two different temperatures $T_1$, $T_2$ and a second calibration parameter $k_V$ representing the calibration at two different supply voltages $V_1$, $V_2$. That is, $$k_T=(\phi(T_2)-\phi(T_1))/(\psi(T_2)-\psi(T_1)), \text{ and} \quad (11)$$

$$k_V=(\phi(V_2)-\phi(V_1))/(\psi(V_2)-\psi(V_1)), \quad (12)$$

wherein $k_T$ is determined at constant supply voltage and $k_V$ is determined at constant temperature. Two estimated phase shifts can be determined analogously to equation 10 and then superposed to a total phase shift which is caused by temperature and supply voltage drift.

In some implementations, the calibration procedure discussed above is repeated in different temperature ranges (or supply voltage ranges, etc.). In this case, it is assumed that the calibration parameter k is valid for a specific range within a given temperature interval (or voltage interval) and different calibration parameters are determined for different ranges. This can be seen as a generalization of the previously discussed approach and is discussed in the following for the influence parameter "temperature". Both, external phase $\phi_n=\phi(T_n)$ and internal phase $\psi_n=\psi(T_n)$ at temperatures $T_n$ for an arbitrary number of calibration points with index n. Then, the calibration parameter $k_n=(\phi_{n+1}-\phi_n)/(\psi_{n+1}-\psi_n)$ can be calculated for any two neighboring calibration points n and (n+1). During operation, the steps of equations 8-10 are performed, wherein the calibration parameter $k_n$ with subscript n is selected such that the corresponding temperature $T_n$ is close to operation temperature $T_{OP}$. In some implementations, calibration measurements have been performed at temperatures $T_1=-10°$, $T_2=20°$ and $T_3=50°$ resulting in piecewise applicable calibration parameters $k_1$ and $k_2$, valid in ranges $T_1 \le T < T_2$ and $T_2 \le T < T_3$. Later, during operation, the internal phase value $\psi(T_{OP})$ is measured at, for example, temperature $T_{OP}=30°$ and the corresponding calibration parameter is selected (in the present example $k_2$ since $T_2 \le T_{OP} < T_3$) and equations 8-10 are applied analogously. It is understood that, although the calibration parameters $k_n$ are calculated for a range between two calibration points, the estimation of $\phi_{EST}$ beyond the calibration points (extrapolation) is straight forward (in the mentioned example, $k_1$ is used for $T_{OP} < T_1 = -10°$ and $k_2$ for $T_{OP} > T_3 = 50°$.

Different calibration values may be determined for every output channel of the radar system. However, in many applications those output channels, which are integrated in the same radar chip (MMIC), will exhibit practically the same behavior, so that it is sufficient to determined one or more calibration parameters (for one or more temperature ranges) for each radar chip and use the same calibration parameter(s) for all output channels of a particular radar chip.

Figure 12:
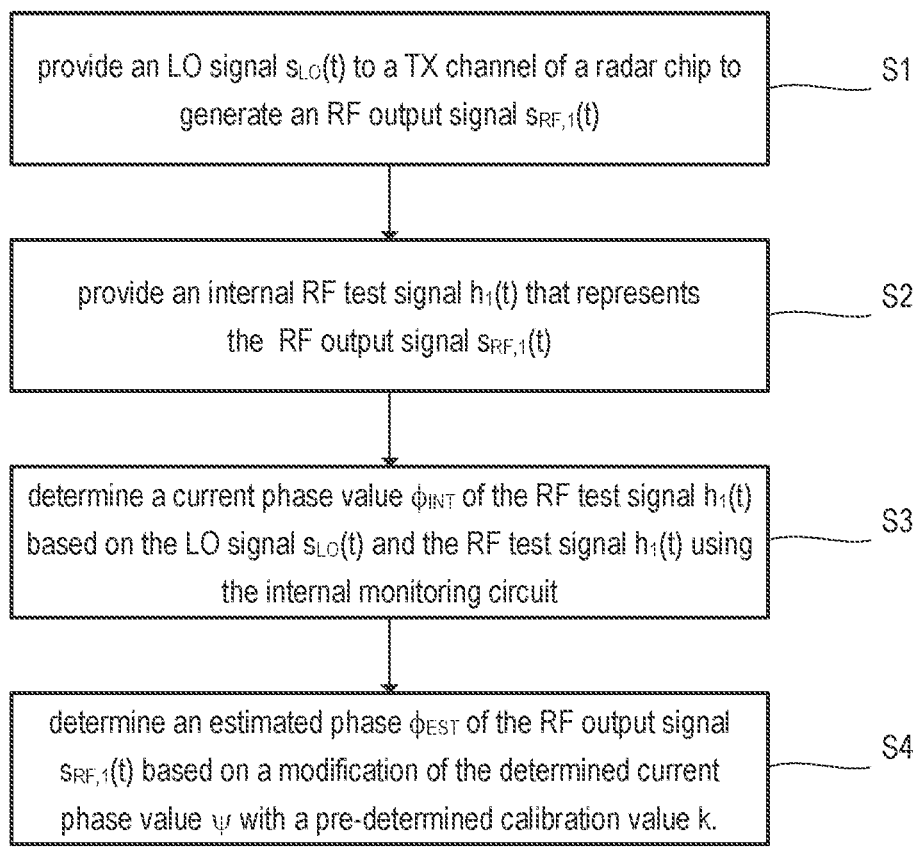
FIG. 12 illustrates an example method for monitoring the phase of an RF output signal of a transmit (TX) channel during operation and using the calibration parameter determined in accordance with the method illustrated in FIG. 11.

During regular operation of the radar chip, the calibration parameter(s) can be used to estimate a phase of the RF output signal $s_{RF,1}(t)$ or a particular output channel. One example is illustrated by the flow chart of FIG. 12. It illustrates an example method for monitoring the phase of an RF output signal of a transmit channel during operation and using the calibration parameter determined in accordance with the method illustrated in FIG. 11. According to FIG. 12 an LO signal $s_{LO}(t)$ is provided to a transmit channel of a radar chip, and the transmit channel generates an RF output signal $s_{RF,1}(t)$ based on the LO signal $s_{LO}(t)$ (see also FIG. 5, output channel TX1, and FIG. 12, step S1). Further, an internal RF test signal $h_1(t)$ is generated as discussed above (see FIG. 5, coupler 106, and FIG. 12, step S2). The test signal $h_1(t)$ represents the RF output signal $s_{RF,1}(t)$ but has only a fraction of the output power of the output channel. Furthermore, the method includes determining a current phase value (instantaneous phase value at the time the measurement is made) of the RF test signal, based on the local oscillator signal $s_{LO}(t)$ and the RF test signal $h_1(t)$), which are processed by an internal monitoring circuit included in the radar chip (cf. FIG. 12, step S3). An estimated phase $\phi_{EST}$ of the RF output signal $s_{RF,1}(t)$ is then determined based on a modification of the determined current phase value with a pre-determined calibration value k, which may be calculated as discussed above with reference to FIG. 11 (cf. FIG. 12, step S4). In some implementations, the mentioned modification may consist of a scaling and adding/subtracting an offset (see equation 8). The estimated $\phi_{EST}$ may be determined by a processing unit, which may include one or more processors and memory for storing software instructions that, when executed by the processor, perform the method described above. The processing unit may be fully or partially implemented in the system controller and or a dedicated signal processing unit (see, e.g. FIG. 3, controller 50, signal processing unit 40). Additionally, or alternatively, the processing unit may include one-time programmable or hard-wired digital signal processing circuits. It is understood that the processing unit may be distributed across different hardware entities (semiconductor chips). In fact, any entity including hardware and (optionally) software and which is suitable and capable for performing the functions and methods described herein can be regarded as processing unit.

Referring again to the flow-chart of FIG. 11, it is noted that the LO signal $s_{LO}(t)$ may be generated "on chip" by a local oscillator integrated in the radar chip. However, the calibration method may utilized for radar systems including a plurality of "slave" chips which receive the LO signal at an RF chip contact (e.g., a pin or a solder ball or the like). Similarly, the RF output signal $s_{RF,1}(t)$ is output at a dedicated RF chip contact (e.g., a solder ball, dependent on the chip package), and the phase values $\phi(T_1)$ and $\phi(T_1)$ may be determined (cf. FIG. 11, step C4) based on the RF output signal ($s_{RF,1}(t)$) tapped (and sensed) at the RF chip contact of the respective radar chip. Alternatively, the RF output signal ($s_{RF,1}(t)$) may be radiated by an antenna connected to the RF chip contact of the output channel. The radiated signal is then received by a receive antenna (e.g., via a reflector), and the phase values $\phi(T_1)$ and $\phi(T_2)$ are then determined based on the received signal. A receive antenna of a test equipment may be used for this purpose or, alternatively, a receive antenna of the radar system under test connected to a receive channel.

Although the implementation has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond— unless otherwise indicated—to any component or structure, which performs the specified function of the described component (e.g., that is functionally equivalent), even though not structurally equivalent to the disclosed structure, which performs the function in the herein illustrated example implementations of the implementation.

The invention claimed is:

1. A method comprising:
providing a local oscillator signal to a transmit channel of a radar chip, the transmit channel generating a radio frequency (RF) output signal based on the local oscillator signal;
providing an internal RF test signal which is generated by applying the local oscillator signal to the transmit channel;
determining a first phase value for a first value of an influence parameter of the radar chip and a second phase value for a second value of the influence parameter of the radar chip based on internal measurements of the first phase value and the second phase value, the internal measurements being based on the internal RF test signal and the local oscillator signal;
determining a third phase value for the first value of the influence parameter of the radar chip and a fourth phase value for the second value of the influence parameter of the radar chip based on the RF output signal;
calculating a calibration parameter based on the first phase value, the second phase value, the third phase value, and the fourth phase value; and
using, during operation of the radar chip, the calibration parameter to estimate a phase of the RF output signal.

2. The method of claim 1, wherein the local oscillator signal is received at a chip contact of the radar chip.

3. The method of claim 1, wherein one or more of:
the first value of the influence parameter and the second value of the influence parameter are different temperature values, or
the first value of the influence parameter and the second value of the influence parameter are different voltage values of a supply voltage of the radar chip.

4. The method of claim 1, wherein determining the third phase value comprises:
receiving the RF output signal at an RF chip contact of the radar chip or radiating the RF output signal via an antenna coupled to a chip contact of the radar chip and receiving the RF output signal using a receive antenna, and
determining the third phase value from the received RF output signal.

5. The method of claim 1, wherein calculating the calibration parameter comprises:
determining a first phase difference between the first phase value and the second phase value, and a second phase difference between the third phase value and the fourth phase value; and
calculating the calibration parameter based on the first phase difference and the second phase difference.

6. The method of claim 5, wherein calculating the calibration parameter comprises calculating a ratio $\Delta\phi/\Delta\psi$ between the second phase difference and the first phase difference.

7. The method of claim 1, wherein using the calibration parameter to estimate the phase of the RF output signal comprises:
determining a current phase value based on the internal RF test signal; and
estimating the phase of the RF output signal based on the current phase value and the calibration parameter.

8. The method of claim 7, wherein an estimated phase value is calculated based on the current phase value scaled by the calibration parameter.

9. The method of claim 7, wherein determining the current phase value includes:
combining the local oscillator signal and the internal RF test signal using an RF mixer; and
calculating the current phase value based on an output signal of the RF mixer.

10. The method of claim 1, wherein the first value of the influence parameter and the second value of the influence parameter are within a first range, and wherein the method further comprises:
determining a fifth phase value for a third value of the influence parameter of the radar chip and a sixth phase value for a fourth value of the influence parameter of the radar chip based on internal measurements of the fifth phase value and the sixth phase value, the internal measurements being based on the internal RF test signal and the local oscillator signal;
determining a seventh phase value for the third value of the influence parameter of the radar chip and an eighth phase value for the fourth value of the influence parameter of the radar chip based on the RF output signal, wherein the third value of the influence parameter and the fourth value of the influence parameter are within a second range; and
calculating a further calibration parameter based on the fifth phase value, the sixth phase value, the seventh phase value, and the eighth phase value.

11. The method of claim 1, wherein the radar chip comprises a first radar chip, the transmit channel comprises a first transmit channel, and the influence parameter comprises a first influence parameter, and wherein the method further comprises:

providing another local oscillator signal to a second transmit channel of a second radar chip, the second transmit channel generating another RF output signal based on the other local oscillator signal;

providing another internal RF test signal which is generated by applying the other local oscillator signal to the second transmit channel;

determining a fifth phase value for a first value of a second influence parameter of the second radar chip and a sixth phase value for a second value of the second influence parameter of the second radar chip based on internal measurements of the fifth phase value and the sixth phase value, the internal measurements being based on the other internal RF test signal and the other local oscillator signal;

determining a seventh phase value for the first value of the second influence parameter of the second radar chip and an eighth phase value for the second value of the second influence parameter of the second radar chip based on the other RF output signal;

calculating another calibration parameter based on the fifth phase value, the sixth phase value, the seventh phase value, and the eighth phase value; and using, during operation of the second radar chip, the other calibration parameter to estimate a phase of the other RF output signal.

12. A method comprising:
providing a local oscillator signal to a transmit channel of a radar chip, the transmit channel generating a radio frequency (RF) output signal based on the local oscillator signal;

providing an internal RF test signal which is generated by applying the local oscillator signal to the transmit channel;

determining a current phase value of the internal RF test signal, based on the local oscillator signal and the internal RF test signal; and determining an estimated phase of the RF output signal based on a modification of the determined current phase value with a pre-determined calibration value.

13. The method of claim 12, further comprising:
setting a phase shift generated by a phase shifter included in the transmit channel based on the estimated phase.

14. The method of claim 12,
wherein the pre-determined calibration value represents a relation between a change of phase of the internal RF test signal and a corresponding change of phase of the RF output signal based on a defined change of an influence parameter.

15. The method of claim 12, further comprising:
determining a value of an influencing parameter, and
selecting the pre-determined calibration value based on the determined value of the influencing parameter.

16. A radar system comprising:
a transmit channel of a radar chip configured to:
receive a local oscillator signal,
generate a radio frequency (RF) output signal based on the local oscillator signal,
provide an internal RF test signal which is generated by applying the local oscillator signal to the transmit channel;
a monitoring circuit configured to:
receive the local oscillator signal and the internal RF test signal, and
determine a current phase of the internal RF test signal based on the local oscillator signal and the internal RF test signal; and
a processing unit configured to:
determine an estimated phase of the RF output signal based on modifying the current phase with a pre-determined calibration factor.

17. The radar system of claim 16, wherein the processing unit is configured to determine the estimated phase based on a scaling of the current phase with the pre-determined calibration factor.

18. The radar system of claim 16, wherein the processing unit is configured to determine the estimated phase based on a scaling of the current phase with the pre-determined calibration factor and a phase offset superposed to the scaled current phase.

19. The radar system of claim 16, further comprising:
a master radar chip that includes a local oscillator configured to generate the local oscillator signal, the master radar chip including an RF chip contact, at which the local oscillator signal is provided,
wherein the radar chip includes another RF chip contact connected to the RF chip contact of the master radar chip to receive the local oscillator signal from the master radar chip.

20. The radar system of claim 16, wherein the pre-determined calibration factor depends on a current temperature.

* * * * *